Nov. 3, 1953  F. P. CRANDON ET AL  2,657,512
CRANBERRY VINE TRIMMER
Filed May 18, 1950  3 Sheets-Sheet 3
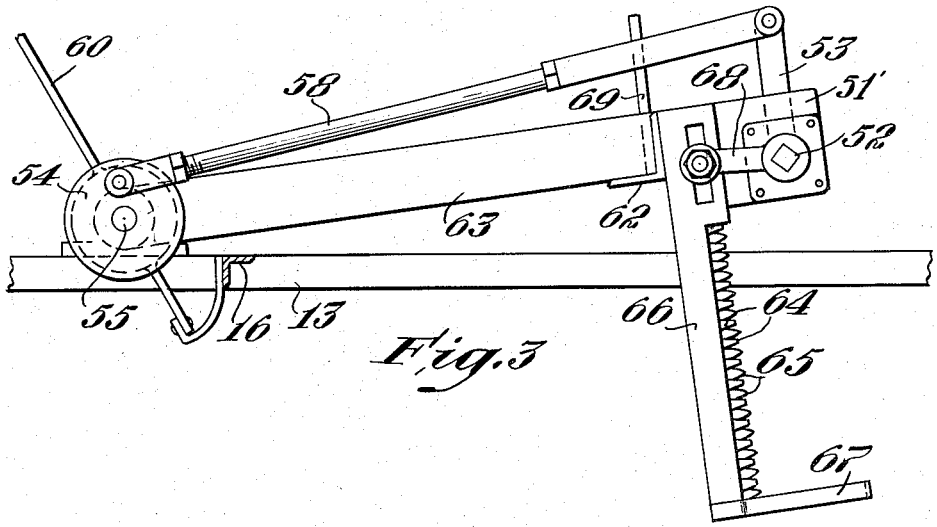
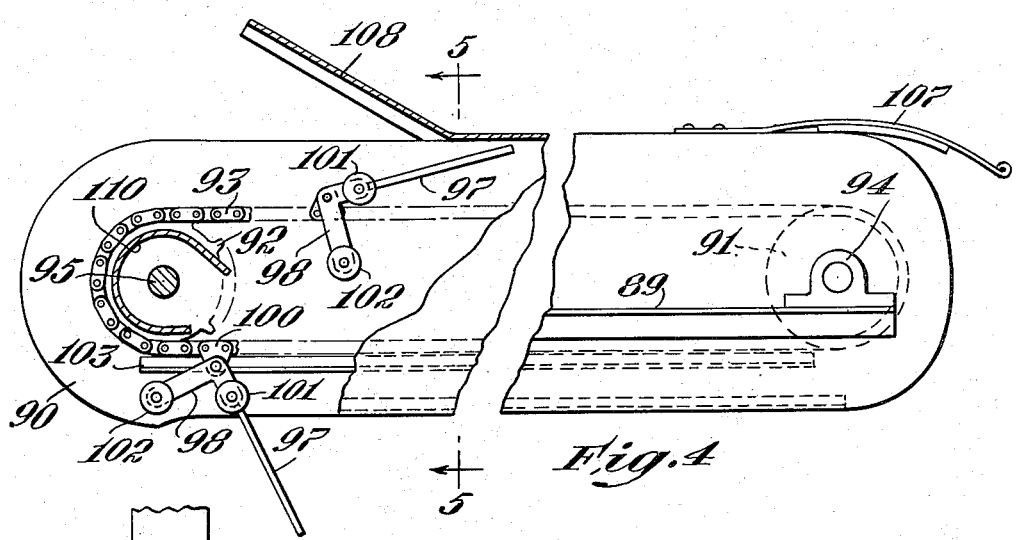
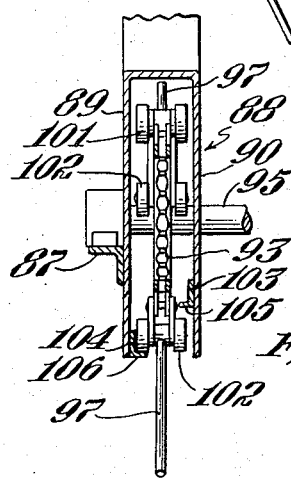
Inventors
Frank P. Crandon
Herbert C. Leonard
by Roberts, Cushman & Grover
Att'ys.

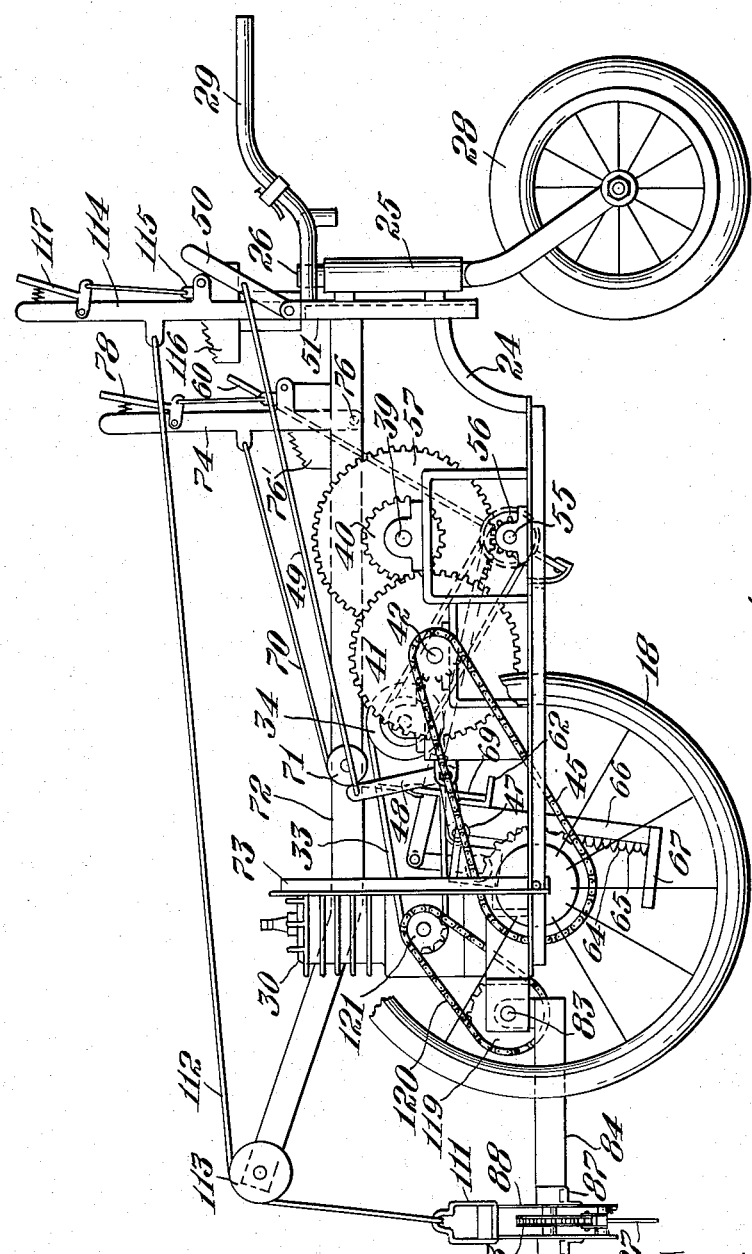

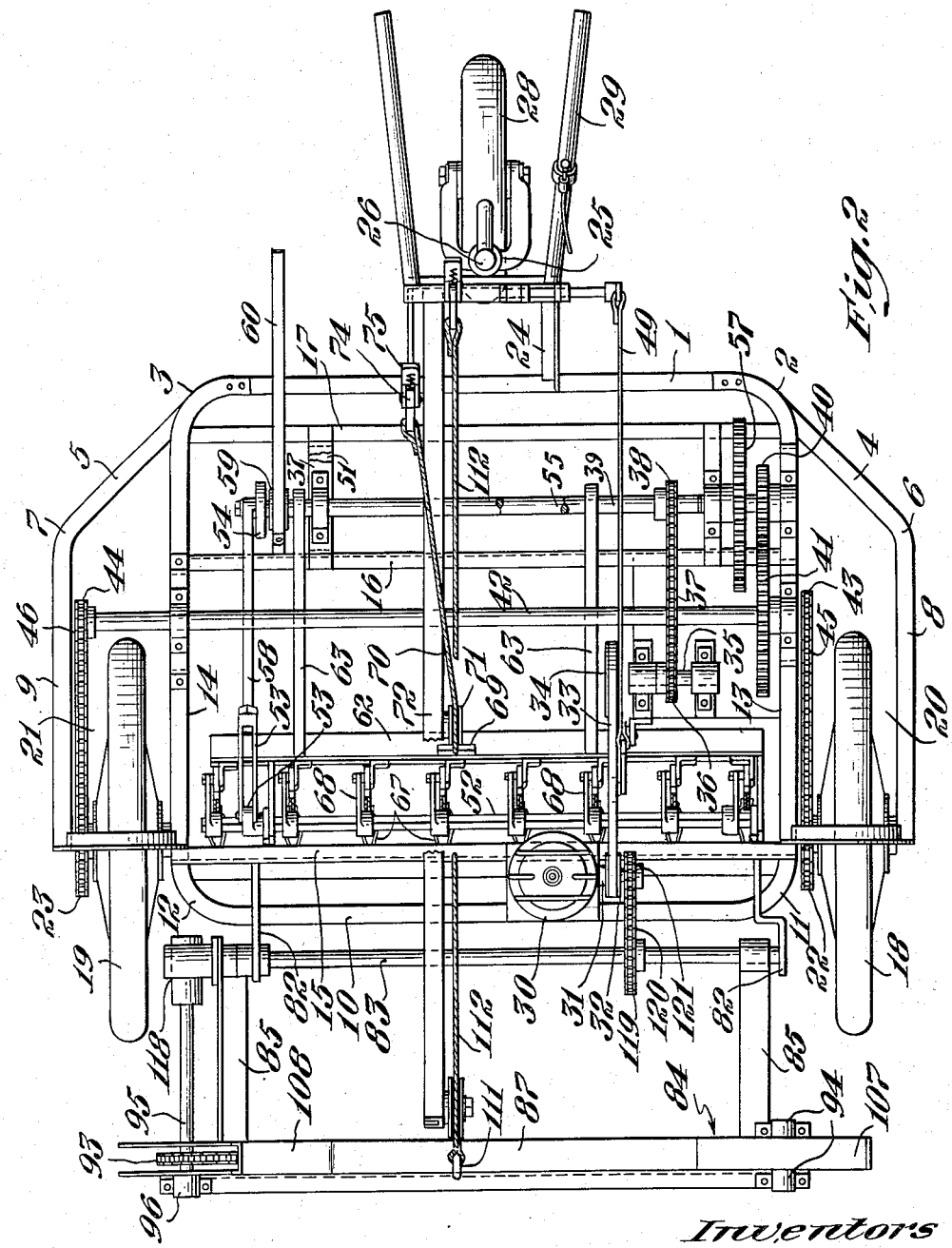

Patented Nov. 3, 1953

2,657,512

UNITED STATES PATENT OFFICE 2,657,512

CRANBERRY VINE TRIMMER

Frank P. Crandon and Herbert C. Leonard, Acushnet, Mass.

Application May 18, 1950, Serial No. 162,734

4 Claims. (Cl. 56—8)

This invention pertains to cranberry culture and more especially to apparatus for trimming off surplus growth of cranberry vines.

The cranberry plant is a perennial, wiry-stemmed, low growing, many branched vine which lengthens from year to year. Thus, if its growth be unchecked, it will, in the course of time, form a mat of very substantial depth and so entangled that proper culture and the harvesting of the berries become very difficult. To prevent such excess lengthening of the vines and to keep the vines within bounds such as to admit of satisfactory culture and harvesting, the present invention has for its principal object the provision of apparatus for trimming away excess vine growth. A further object is to provide power driven trimming means designed to be propelled across the bog and having provision for lifting and holding the vines into the field of action of the cutting means. A further object is to provide trimming means having provision for varying the amount of surplus growth which is trimmed off. Other and further objects and advantages of the invention will be pointed out in the following more detailed description and by reference to the accompanying drawings wherein Fig. 1 is a side elevation of apparatus embodying the present invention;

Fig. 2 is a plan view of the apparatus of Fig. 1;

Fig. 3 is a fragmentary plan view of one of the vine-holding means and the associated cutting means;

Fig. 4 is a front end elevation showing the vine-agitating and lifting means; and Fig. 5 is a fragmentary, vertical section taken on the line 5—5 of Fig. 4.

The vine trimming means of the present invention is mounted upon a suitable support or carriage which may be propelled over the bog. As here illustrated, the carriage is mounted on wheels, but it is to be understood that any suitable means for supporting the carriage may be adopted, such as is appropriate to the particular bog or mode of cultivating the bog.

As here illustrated by way of example, but without limitation, this carriage or support is formed, in large part at least, of angle-bar stock. A piece of this bar stock forms the rear horizontal rail 1 of the carriage (Fig. 2), this length of material being bent at the points 2 and 3 and thence extending divergently outward to form the side members 4 and 5. These in turn are bent at the points 6 and 7 to provide the substantially parallel side rails 8 and 9, respectively. Another length of angle-bar stock provides the front rail 10, this length of material being bent at 11 and 12 to provide the parallel side rails 13 and 14, these side rails being rigidly connected at their rear ends to the members 4 and 5, respectively. Other pieces of angle-bar stock or appropriate material are arranged to form the transversely extending rails 15, 16 and 17 which are rigidly secured at their ends to the side rails 13 and 14 respectively.

Front wheels 18 and 19 are arranged within the spaces 20 and 21 intervening between the rails 8 and 13, and 9 and 14 respectively. These front wheels 18 and 19 are mounted on shafts which are aligned with each other and which turn in bearings carried by the side rails of the frame. A sprocket wheel 22 is fixed to the hub of the wheel 18 and a similar sprocket wheel 23 is fixed to the hub of the wheel 19. Preferably the wheels 18 and 19 are of bicycle type, having pneumatic tires, although other forms of wheel may be employed. Wheels of light weight are desirable to avoid injury to the cranberry vines.

A bracket 24 is secured to the rear rail 1 of the frame and supports a vertical swivel-bearing 25 (Fig. 1) for a steering shaft 26. This shaft is forked at its lower end and provided with bearings for the steering wheel 28 which may be of the same general type as the wheels 18 and 19. A handle 29 is fixed to the upper end of the shaft 26, by means of which the wheel 28 may be turned to steer the apparatus in its progress across the bog.

A motor 30 (Fig. 2), preferably an internal combustion engine, is mounted upon the forward part of the frame, for example it may be carried by the rails 16 and 15. This motor has a shaft 31 (Fig. 2) carrying a pulley 32 which is embraced by an endless belt 33 (Fig. 1) passing around a pulley 34 on a shaft 35 mounted in suitable bearings carried by the frame. A sprocket 36 (Fig. 2) is fixed to the shaft 35 and is embraced by a chain 37 which engages a sprocket 38 on a shaft 39 extending transversely across the machine and turning in elevated bearings 37 supported by the side rails 13 and 14, respectively. A gear 40 is fixed to the shaft 39 and meshes with a gear 41 carried by a shaft 42 mounted in elevated bearings supported by the side rail 13. A sprocket wheel 43 is mounted on one end of the shaft 42 and is embraced by a sprocket chain 45 (Fig. 2). A similar sprocket wheel 44 is mounted on the opposite end of shaft 42 and is embraced by a chain 46. The chains 45 and 46, respectively, engage the sprocket wheels 22 and 23 fixed to the supporting and driving wheels 18 and 19.

A belt-tightening pulley 47 bears against the lower run of the belt 33, the pulley 47 being carried by a bell-crank lever 48 pivotally mounted on one of the bearings for the shaft 35. This bell-crank lever is connected by a rod 49 to an actuating handle 50 pivoted on a bracket 51 at the rear of the machine. By swinging the handle 50 the pulley 47 may be pressed against the belt 43 thereby tightening the latter about the pulleys 32 and 34 so that the belt drives the pulley 34, and through the connections above described, causes the drive wheels 18 and 19 to rotate and progress the apparatus across the bog. The belt-tightening pulley herein disclosed is merely by way of example of a manually controllable clutch.

A square shaft 52 extends from side to side of the machine, being mounted in bearing plates 51' (Fig. 3) fastened to the forward side of an angle bar 62 to be described hereinafter, and one end of this shaft is fastened to the lower end of an arm 53 (Fig. 3). The upper end of the arm 53 has fastened to it a driving rod 58 which extends rearwardly and is pivotally connected to a disk 54 mounted on a shaft 55 (Fig. 1) extending across the machine directly below the shaft 39 and mounted in suitable bearings. One of the bearings is carried by the rail 13 and the other is carried by a support 51 fast at its forward and rear ends to the rails 16 and 17. A pinion 56 (Fig. 1) is fixed to one end of the shaft 55 and meshes with a relatively large spur gear 57 fixed to the shaft 39. Rotation of the shaft 39 thus normally rotates the shaft 55 at a substantially higher speed. A clutch 59 (Fig. 2) mounted on the shaft 55 is operable by a lever 60 which extends upwardly and rearwardly rotatably to connect the disk 54 to the shaft 55 and hence to impart rotation thereto. Rotation of the disk imparts oscillation to the rod 53 which in turn imparts oscillation to the square shaft 52.

The shaft 52 effects operation of a series of cutters for trimming the vines. Each of these cutters (Fig. 3) comprises fixed and movable blades carried by a transverse angle bar 62 fastened to the forward end of a pair of forwardly extending spaced arms 63, the rear ends of which are pivotally supported on the shaft 55. The cutters are distributed along the angle bar 62 and are attached thereto by brackets fastened to the forward face of the angle bar. As here illustrated there are eight of these cutters spaced equally, longitudinally of the bar. Obviously a greater or lesser number of cutters may be used as desired. One of the blades (Fig. 3) has pointed teeth 64 and is fixed to its bracket while the other has blunt teeth 65 and is slidable with respect to the fixed blade. The blades are held in contact by suitable retainer plates 66 overlying them which are in the form of guards housing the rear parts of the cutter blades. Movement of each movable blade is effected by an arm 68 one end of which is pivotally connected to the upper end of the blade and the other end of which is fixed on the square shaft 52 so that oscillation of the shaft 52 reciprocates the movable blade. As mounted, the toothed edges of the cutters face forwardly and are inclined forwardly and downwardly. At the lower end of the guard 66 for each cutter is a forwardly projecting prong 67 which is arranged to support and hold the vines elevated in contact with the cutting edges of the cutters.

The cutters and vine-supporting prongs 67 are arranged to be elevated or lowered and to this end there is attached to the angle bar 62, substantially at the mid portion thereof, an upright bracket 69. The upper end of the bracket has connected to it one end of a flexible cable 70 which runs over a pulley 71, the latter being attached to a horizontal bar 72 extending forwardly and rearwardly of the frame, the forward end being fixed to the bracket 51 and the rear end being fixed to an upright 73 rising from the horizontal bar 15. The rear end of the cable 70 is fastened to a handle 74. This handle is pivoted at 76 to the bar 72 and is provided with a pivoted dog 75 (Fig. 2) engageable with the retaining teeth on a fixed segment 76' carried by the bar, the dog being disengageable from the retaining teeth by means of a controlling handle 78. When the dog is disengaged from the teeth the handle 74 may be swung, thus elevating or lowering the cutters and hence controlling the trimming so that the vines may be cut to any desired length.

Brackets 82 extend forwardly from the transverse bar 15 and support vine-agitating means, indicated generally at 84. A shaft 83 extends transversely of the machine and is journaled near its ends in the brackets 82. Pivotally mounted upon the shaft 83 is a pair of spaced forwardly projecting arms 85. Angles 87 are fixed to forward ends of the arms 85 and there is fastened to the angles, in an inverted position, a U-shaped channel beam 88 (Fig. 5) having spaced parallel front and rear walls 89 and 90. Between the walls 89 and 90 there is mounted a pair of sprockets 91 and 92 which are embraced by a chain 93. The sprocket 91 is mounted on a short shaft journaled between suitable bearings 94 fastened to the outer sides of the walls of the channel beam and the sprocket 92 is fixed to a shaft 95 entering the rear wall 90 and extending into a bearing 96 fixed to the outside of the opposite wall. Rotations of the shaft 95 will effect movement of the chain continuously about the sprockets. Upon the chain 93 there is fastened a number of vine-agitating and lifting arms 97. Each arm is fixed to one leg of an angle 98 pivoted at a corner between a pair of lugs 100 fastened to a chain. Rollers 101 and 102 are mounted on the ends of the legs of angles 98. Extending along the lower run of the chain there are angle bars 103 and 104 fixed to the walls 89 and 90 having inwardly projecting vertically spaced flanges 105 and 106, spaced sufficiently to receive them between the rollers 101 and 102 so as to hold the fingers 97 during their movement inclined forwardly and downwardly in their direction of movement as shown in Fig. 4. As the fingers 97 travel across the machine they lift, straighten and comb the vines so that they occupy better positions for engagement with the cutters. As each finger reaches the right-hand end of its combing stroke it rises about the sprocket 91 and returns along the upper run of the chain to the left end of the machine. To tip the fingers so that they will enter beneath the top of the channel 88 a yieldable guide plate 107 is fastened to the top for intercepting the finger as it moves upwardly. Near the left end of the channel the top is cut and bent upwardly at an angle as shown at 108 to permit the finger to begin to rise as it begins to move about the left-hand sprocket 92, so that it may tip over into the position shown at the bottom. In fact to insure proper tipping a cam plate or track 110 (Fig. 4) is arranged at this end of the chain with which the roller 102 will have contact so as to tip the angle about its pivot.

Rotation of the shaft 95 to drive the chain 93 is effected by way of meshing gears fixed to the rear end of the shaft 95 and one end of the shaft 83, the gears being concealed by appropriate covers 118 (Fig. 2). The shaft 83 has fixed to it a sprocket 119, rotation of which is effected by a chain 120 embracing it and a sprocket 121 secured to the motor shaft 32.

It is desirable to adjust the height of the agitator 84 with reference to the ground, hence there is fastened to the top of the channel 88, substantially at the mid-point thereof, a bail 111 to which one end of the flexible cable 112 is attached. The cable 112 runs upwardly over a pulley 113 (Fig. 1), mounted on an upwardly inclined extension of the bar 72, and then rearwardly to an operating handle 114. The handle 114 is pivoted at its lower end to the bracket 51 and has a pivoted dog 115 engageable with retaining teeth on a fixed segment 116 carried by the bracket, the dog being disengageable from the retaining teeth by means of a controlling handle 117. When the dog is disengaged from the teeth, the handle 114 may be swung, thus to elevate or lower the agitator and hence to control the depth of penetration of the agitator fingers into the vines.

In operation, as the machine is progressed by the motor and drive wheels across the bog, the agitating means stirs up the vines so as to loosen them and to draw them into generally parallel relation transversely so that when the vines are engaged by the cutters they lie nearly at right angles to the teeth. The agitators also lift the vines upwardly onto the supporting prongs which hold them in the field of action of the cutting means. The traverse of the machine across the bog is controlled by the handle 50, while the operation of the cutting means is controlled by the clutch handle 60. The height of the prongs 67 from the ground is regulated by moving the handle 74 and of the agitator by moving the handle 114. Thus, the various functions of the machine are controlled from the rear of the machine where the controlling elements are easily accessible to the operator.

While one desirable embodiment of the invention has been illustrated and described by way of example, it is to be understood that the invention is broadly inclusive of any and all modifications falling within the scope of the appended claims.

We claim:

1. Apparatus for trimming cranberry vines comprising in combination a support designed to be propelled over the cranberry bog, vine-cutting means mounted on the support, a motor, means operably connecting the motor to the vine-cutting means for effecting actuation of the same, means associated with the cutting means for holding the vines in the field of operation of the cutting means, a plurality of rods mounted on the support forwardly of the cutting means for engagement with the vines prior to contact of the cutter therewith and means for imparting continuous movement to the rods to cause them to traverse the frame successively for combing the vines laterally to lay them crosswise of the cutting means.

2. In an apparatus according to claim 1, a horizontal support mounted on the frame forwardly of the cutting means and extending transversely thereof, and a plurality of equally spaced fingers arranged to travel along the lower side of the support in one direction, and along the top side of the support in the opposite direction, said fingers being inclined downwardly and laterally in the direction of travel in a vertical plane.

3. In an apparatus according to claim 1 a horizontal support mounted on the frame so as to extend transversely of the machine forwardly of the cutting means, means pivotally supporting the horizontal support for movement about a horizontal axis, and means for lifting and lowering the support to adjust the heightwise position of the rods with reference to the ground.

4. In an apparatus according to claim 1 a horizontally arranged beam mounted on the frame forwardly of the cutters so as to extend transversely thereof, endless chains mounted on the beam for movement transversely of the machine, means for driving the chain continuously, a plurality of rods pivotally attached to the chain at spaced intervals for movement therewith in a closed path, means on the beam to hold the rods as they travel along the lower run of the chain inclined downwardly in the direction of movement of the chain as it travels across the machine in one direction and guide means for holding the rods nearly parallel to the upper run of the chain during return movement of the rods in the opposite direction.

FRANK P. CRANDON.
HERBERT C. LEONARD.

References Cited in the file of this patent

UNITED STATES PATENTS

| Number | Name | Date |
| --- | --- | --- |
| 314,979 | Rufus | Mar. 31, 1885 |
| 989,224 | Barnes | Apr. 11, 1911 |
| 1,629,831 | Maglathlin | May 24, 1927 |
| 2,240,066 | Bingham | Apr. 29, 1941 |